(12) United States Patent
Sivinski

(10) Patent No.: US 11,357,161 B2
(45) Date of Patent: Jun. 14, 2022

(54) GAUGE WHEEL ARM WITH SPLIT END AND THREADED BORE

(71) Applicant: Harvest International, Inc., Storm Lake, IA (US)

(72) Inventor: Jeffrey Alan Sivinski, Cherokee, IA (US)

(73) Assignee: Harvest International, Inc., Storm Lake, IA (US)

( * ) Notice: Subject to any disclaimer, the term of this patent is extended or adjusted under 35 U.S.C. 154(b) by 273 days.

(21) Appl. No.: 16/661,468

(22) Filed: Oct. 23, 2019

(65) Prior Publication Data
US 2020/0178457 A1 Jun. 11, 2020

Related U.S. Application Data

(60) Provisional application No. 62/776,848, filed on Dec. 7, 2018.

(51) Int. Cl.
*A01C 5/06* (2006.01)
*A01C 7/20* (2006.01)
(Continued)

(52) U.S. Cl.
CPC ............ *A01C 5/064* (2013.01); *A01B 35/28* (2013.01); *A01B 63/006* (2013.01);
(Continued)

(58) Field of Classification Search
CPC ......... A01C 5/064; A01C 7/203; A01B 15/16; A01B 35/28; A01B 63/006; A01B 63/026;
(Continued)

(56) References Cited

U.S. PATENT DOCUMENTS 1,367,615 A * 2/1921 Malone ............... F16B 39/286
411/937
2,253,436 A * 8/1941 Leighton ............. B62D 17/00
280/86.756
(Continued)

FOREIGN PATENT DOCUMENTS

CH 338995 A 6/1959
WO 2013101796 A1 7/2013
(Continued)

OTHER PUBLICATIONS

AA41968/A54179 Planter Gauge Wheel Arm Kit fits John Deere, 2015 Catalog, 1 page, Dec. 28, 2017.
(Continued)

*Primary Examiner* — Alicia Torres
*Assistant Examiner* — Ian A Normile
(74) *Attorney, Agent, or Firm* — McKee, Voorhees & Sease, PLC

(57) ABSTRACT

A mounting assembly for a gauge wheel on a row unit allows for infinite lateral adjustment of the gauge relative to an opening disc on the row unit. The mounting assembly includes an arm with a threaded bore extending through a split end of the arm. A threaded bushing is adjustably mounted in the bore and secured in a desired position with a bolt standing through the split end to clamp bushing in position. The split end mounting arm provides a method of quickly and easily adjusting the lateral position of the gauge wheel on the row unit in infinite increments.

9 Claims, 5 Drawing Sheets

(51) Int. Cl.
   *A01B 71/04*   (2006.01)
   *A01B 63/16*   (2006.01)
   *A01B 63/02*   (2006.01)
   *A01B 35/28*   (2006.01)
   *A01B 63/00*   (2006.01)
   *A01B 15/16*   (2006.01)

(52) U.S. Cl.
   CPC .......... *A01B 63/026* (2013.01); *A01B 63/163* (2013.01); *A01B 71/04* (2013.01); *A01C 7/203* (2013.01); *A01B 15/16* (2013.01)

(58) Field of Classification Search
   CPC ....... A01B 63/163; A01B 71/02; A01B 71/04; F16B 2/065; F16B 2/10
   See application file for complete search history.

(56) References Cited

U.S. PATENT DOCUMENTS

| | | | |
|---|---|---|---|
| 4,009,668 A | 3/1977 | Brass et al. | |
| 4,317,489 A | 3/1982 | Steinbach | |
| 4,404,918 A | 9/1983 | Whalen et al. | |
| 4,463,546 A | 8/1984 | Day | |
| 4,570,554 A | 2/1986 | Clark | |
| 4,596,200 A | 6/1986 | Gafford et al. | |
| 4,760,806 A | 8/1988 | Bigbee et al. | |
| 5,235,922 A | 8/1993 | Deckler | |
| 5,321,667 A | 6/1994 | Audi et al. | |
| 5,375,542 A | 12/1994 | Schaffert | |
| 5,427,038 A | 6/1995 | Ege | |
| 5,511,498 A * | 4/1996 | Lohrentz | A01C 5/066 |
| | | | 111/191 |
| 5,538,085 A | 7/1996 | Lowe et al. | |
| 5,544,709 A | 8/1996 | Lowe et al. | |
| 5,669,451 A | 9/1997 | Noonan et al. | |
| 5,676,073 A | 10/1997 | Bergland et al. | |
| 5,697,455 A | 12/1997 | Deckler | |
| 5,826,337 A | 10/1998 | Klinkner et al. | |
| 5,845,471 A | 12/1998 | Seegert et al. | |
| 5,896,820 A | 4/1999 | Klinkner et al. | |
| 5,904,107 A | 5/1999 | Kester | |
| 6,041,584 A | 3/2000 | Hohnl | |
| 6,237,696 B1 | 5/2001 | Mayerle | |
| 6,321,667 B1 | 11/2001 | Shoup | |
| 6,752,094 B1 | 6/2004 | Truax | |
| 6,918,343 B2 | 7/2005 | Kester | |
| 7,631,607 B2 | 12/2009 | Vandersnick | |
| 7,669,536 B2 | 3/2010 | Martin | |
| 7,975,629 B1 | 7/2011 | Martin | |
| 8,267,021 B2 | 9/2012 | Mariman et al. | |
| 8,387,715 B2 | 3/2013 | Rylander | |
| 8,544,516 B2 | 10/2013 | Mariman et al. | |
| 8,616,298 B2 | 12/2013 | Rylander | |
| 8,636,077 B2 | 1/2014 | Bassett | |
| 8,863,857 B2 | 10/2014 | Bassett | |
| 8,910,582 B2 | 12/2014 | Mariman et al. | |
| 8,939,095 B2 | 1/2015 | Freed | |
| 9,113,587 B2 | 8/2015 | Hesla | |
| 9,148,989 B2 | 10/2015 | Van Buskirk et al. | |
| 2005/0072344 A1 | 4/2005 | Kester | |
| 2006/0093246 A1 | 5/2006 | Akita et al. | |
| 2013/0160684 A1 | 6/2013 | Whalen et al. | |
| 2013/0186658 A1* | 7/2013 | Kester | A01B 23/06 |
| | | | 172/558 |
| 2013/0333599 A1 | 12/2013 | Bassett et al. | |
| 2014/0352991 A1 | 12/2014 | Patwardhan et al. | |
| 2015/0000940 A1 | 1/2015 | Patwardhan et al. | |
| 2015/0230392 A1 | 8/2015 | Schafer et al. | |
| 2015/0271986 A1 | 10/2015 | Sauder et al. | |
| 2015/0359162 A1 | 12/2015 | Needham et al. | |
| 2016/0050837 A1 | 2/2016 | Schalfert et al. | |
| 2017/0156253 A1 | 6/2017 | Kester | |
| 2017/0202130 A1 | 7/2017 | Schoolman et al. | |
| 2017/0303464 A1 | 10/2017 | Sivinski et al. | |
| 2018/0228076 A1 | 8/2018 | Sivinski | |
| 2021/0328322 A1* | 10/2021 | Walker | H01Q 1/1228 |

FOREIGN PATENT DOCUMENTS

| | | |
|---|---|---|
| WO | 2015095647 A1 | 6/2015 |
| WO | 2015127054 A1 | 8/2015 |

OTHER PUBLICATIONS

Gauge Wheel Arm Pivot Kit, John Deere 1700 Series Planters, RK Products, Inc., 2 pages, Dec. 28, 2017.

* cited by examiner

GAUGE WHEEL ARM WITH SPLIT END AND THREADED BORE

CROSS-REFERENCE TO RELATED APPLICATIONS

This application claims priority to Provisional Application U.S. Ser. No. 62/776,848, filed on Dec. 7, 2018, which is herein incorporated by reference in its entirety.

SUMMARY OF THE INVENTION

A mounting assembly for lateral adjustment of a gauge wheel on a row planter includes an arm with opposite first and second ends. The first end is split so as to define clamp tips, each of which have a hole through which a bolt extends so that the clamp tips can be tightened and loosened.

A transverse threaded bore extends through the first end of the arm, with a threaded bushing extending into the bore. The arm is mounted to the row unit by the second bolt, with the gauge wheel being mounted on the second end of the arm.

BACKGROUND OF THE INVENTION

Row planter units are precision tools used in farming to plant seeds at uniform depth and spacing to ensure the highest yield potential. To achieve maximum results, the row planter units must be properly maintained and periodically adjusted.

Each row planter unit includes a pair of angularly disposed opening discs to form a V-shaped opening or furrow in the soil into which seeds are planted. The disc openers are followed by a pair of gauge wheels that control the depth of the furrow opened by the discs, and aid in holding the V-shaped profile of the furrow.

In addition to gauging planting depth, these planter gauge wheels firm the soil next to the seed furrow and they act as a "wiper" to help remove sticky soil from the outside of the seed furrow disc opener. The gauge wheels are mounted on pivoting arms, which include bushings rotating on shafts or bolts that require greasing. The gauge wheels are parallel to and are closely spaced to the discs, or contact the disc openers, when properly positioned, to prevent the buildup of dirt or trash between the gauge wheels and the opening discs. Because these gauge wheels operate very close to the disc opener, it imperative that the gauge wheel maintains a close tolerance to the opener discs, as the discs and gauge wheels wear from operating in the soil. Over time, the bushings wear, which cause the gauge wheel angles to change and allow the gauge wheels to move away from the disc openers. As the bushings wear, the gauge wheels spread apart, forming a gap that leads to deterioration of the V-shaped seed furrow profile, which is extremely undesirable, and which ultimately adversely affects yield. Additionally, if the distance between the gauge wheel and the disc opener gets too great, materials such as dirt and residue from previous crops can lodge between the gauge wheel and the seed furrow disc opener and cause plugging of the row unit.

Because of trends towards no-till or reduced tillage planting, planter row units are required to operate in very high residue conditions, increasing the risk of lodging and plugging of the row unit. Keeping the gauge wheels in the desired position by laterally adjusting the gauge wheels against the discs is vital to plug free operation.

There are many different designs of gauge wheel lateral adjustments currently offered on planters. One option is the use of shim washers, which can be removed to allow the gauge arm and gauge wheel to be moved closer to the disc opener. Shim washer adjustable gauge wheels require the gauge wheel and gauge wheel arm to be removed from the row unit, removal of the shim washer between the arm and the row unit shank from the pivot bolt, and re-installation of the gauge wheel and gauge wheel arm. Since there are two gauge wheel arms and wheels per row unit, adjusting these wheels with this shim system is a very tedious, time consuming process. Another disadvantage of this design is that there is not an infinite adjustment of the gauge wheel against the disc opener.

Another option for lateral adjustment of the gauge wheels is a threaded jam/locking nut or set screw to keep the threaded lateral adjustment bushing from rotating in the gauge wheel arm and getting out of adjustment. For example, see published patent application U.S. 2017/0202130.

Jam nut locking for gauge wheel arms are known to have issues with the jam nut coming loose, which allows the lateral adjustment bushing to rotate due to the continuous rocking/pivoting action of the gauge wheel arm. This will cause the gauge wheel to get out of adjustment, i.e. either too tight or too loose, which can cause poor planting.

Set screw style adjustment methods for gauge wheels typically lock against the threads of the lateral adjustment bushing or against a non-threaded area of the threaded adjuster. Because of the continuous rocking/pivoting action of the gauge wheel arm, the set screw can begin to come loose by wearing into the threaded bushing. This wear starts to amplify as the rocking/pivoting action causes increasing wear on the threaded lateral adjust bushing, eventually causing part failure.

Another adjustment design uses a split/clamping arm design and a smooth bushing to allow the gauge wheel arm and gauge wheel to be adjusted. The split clamp style arm on a smooth bushing requires tremendous clamping force of the split arm against the smooth bushing to maintain proper adjustment of the gauge wheel against the disc opener. This system relies solely on clamp pressure to hold the arm in place. Continuous rocking/pivoting of the gauge wheel arm can eventually allow the arm to slide on the smooth bushing and allow the gauge wheel arm to get out of adjustment and premature part failure, which causes poor planting.

Therefore, a primary objective of the present invention is the provision of an improved laterally adjustable gauge wheel for a row planting unit.

Another objective of the present invention is the provision of a row planter gauge wheel which can be quickly and easily laterally adjusted.

A further objective of the present invention is the provision of a laterally adjustable row planting unit gauge wheel which eliminates shim washers, jam nuts, and set screws.

Still another objective of the present invention is the provision a mounting arm for a gauge wheel on a row planting unit which has a split end for clamping the threaded adjustment bushing within a threaded bore on the mounting arm.

Yet another objective of the present invention is the provision of a method for laterally adjusting a gauge wheel on an agricultural row unit utilizing a split end mounting arm with a tightening bolt therethrough.

A further objective of the present invention is the provision of a method of laterally adjusting a gauge wheel on an agricultural row unit with infinite adjustability.

Still another objective of the present invention is the provision of a mounting assembly and method for laterally adjusting a gauge wheel on an agricultural row unit, which avoids the problems of the prior art.

Another objective of the present invention is the provision of an apparatus and method for quickly and easily making lateral adjustments of a gauge wheel on an agricultural row unit.

These and/or other objects, features, and advantages of the disclosure will be apparent to those skilled in the art. The present invention is not to be limited to or by these objects, features and advantages. No single embodiment need provide each and every object, feature, or advantage.

DETAILED DESCRIPTION OF THE INVENTION

Figure 1:
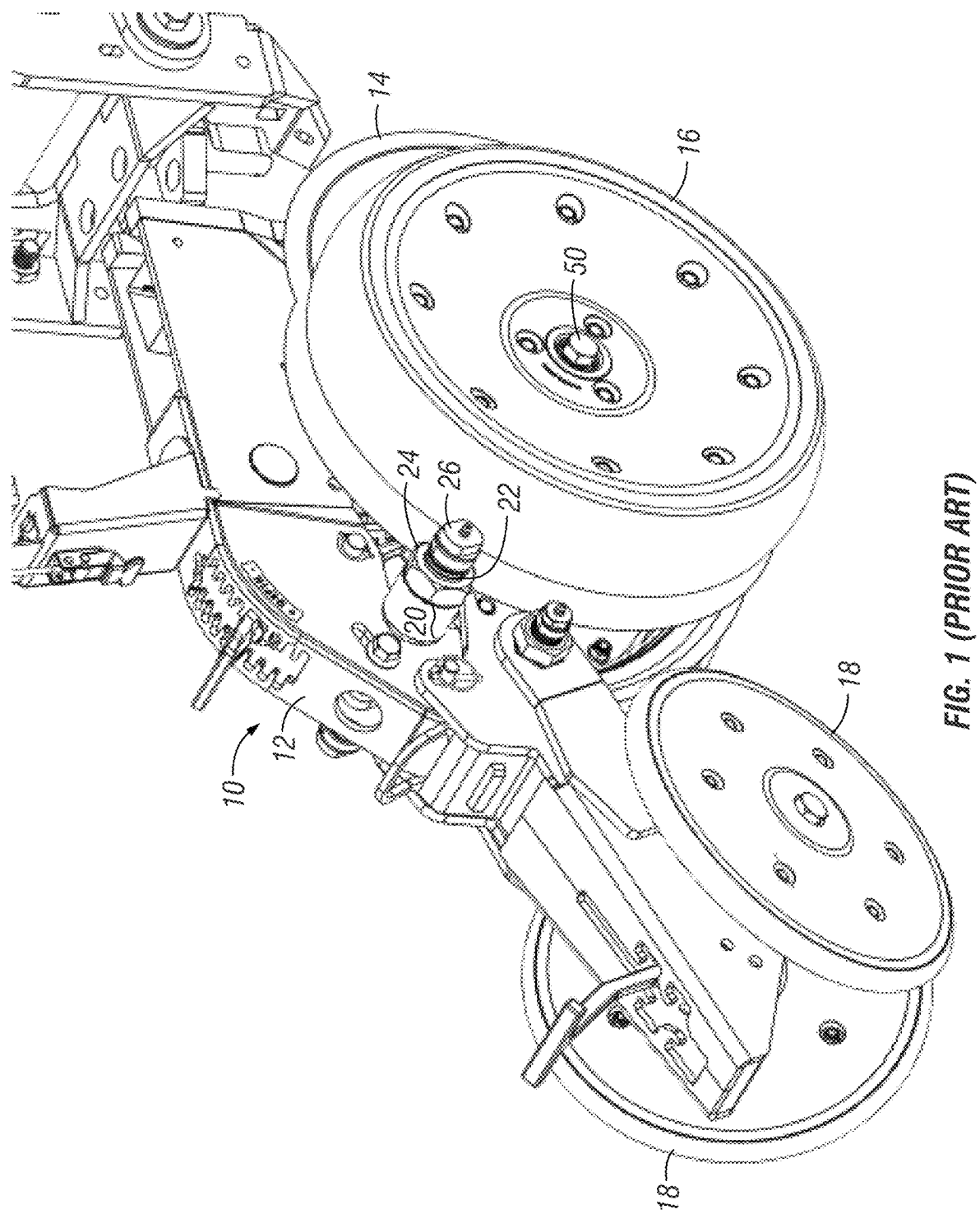
FIG. 1 is a perspective view of a row planting unit with a conventional pivotal mounting arm for the gauge wheels.

A conventional row planting unit 10 is shown in FIG. 1. The planting unit 10 includes a frame 12, a pair of furrow opening discs 14, a pair of gauge wheels 16, and a pair of closing wheels 18. Each gauge wheel 16 is mounted to the frame 12 using a mounting arm 20. In the prior art row planter unit 10 shown in FIG. 1, the mounting arm 20 has a threaded bore for receiving a threaded, greaseless adjustment bushing 22, which is fixed in position by a lock nut 24.

Figure 2:
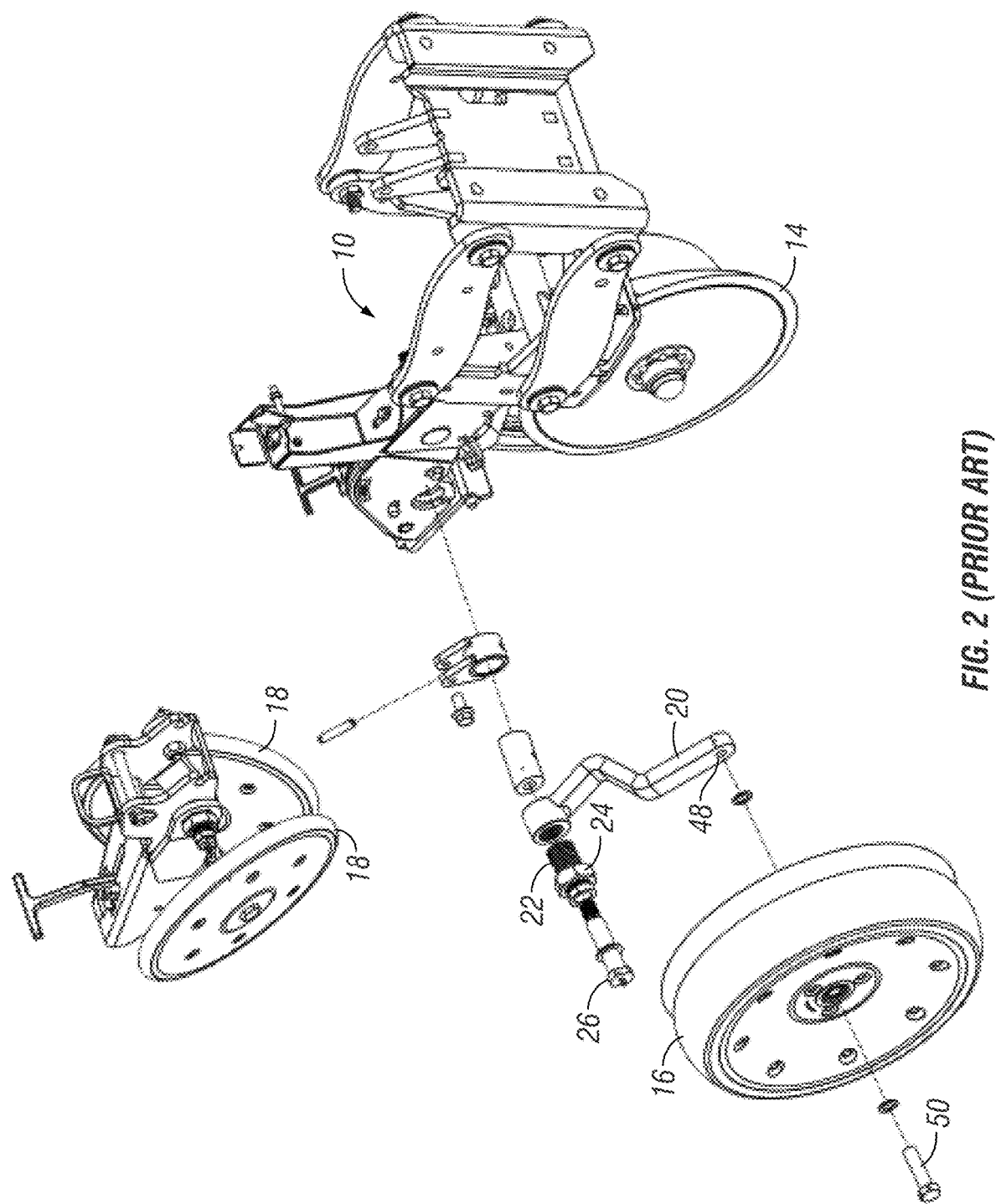
FIG. 2 is an exploded view of the planting unit and conventional gauge wheel pivot arm, as shown in FIG. 1, but with only one gauge wheel and arm shown for simplicity.

A pivot bolt 26 extends through the bushing 22 to allow the gauge wheel 16 to pivot about the axis of the bolt 26, as the row planter unit 10 travels through the field during planting operations. FIG. 2 shows an exploded view of the planter unit 10 shown in FIG. 1. The structure and function of the planter unit 10 shown in FIGS. 1 and 2 is described in Applicant's U.S. Pat. No. 10,299,427 (issued May 28, 2019) incorporated herein by reference in its entirety.

Figure 3:
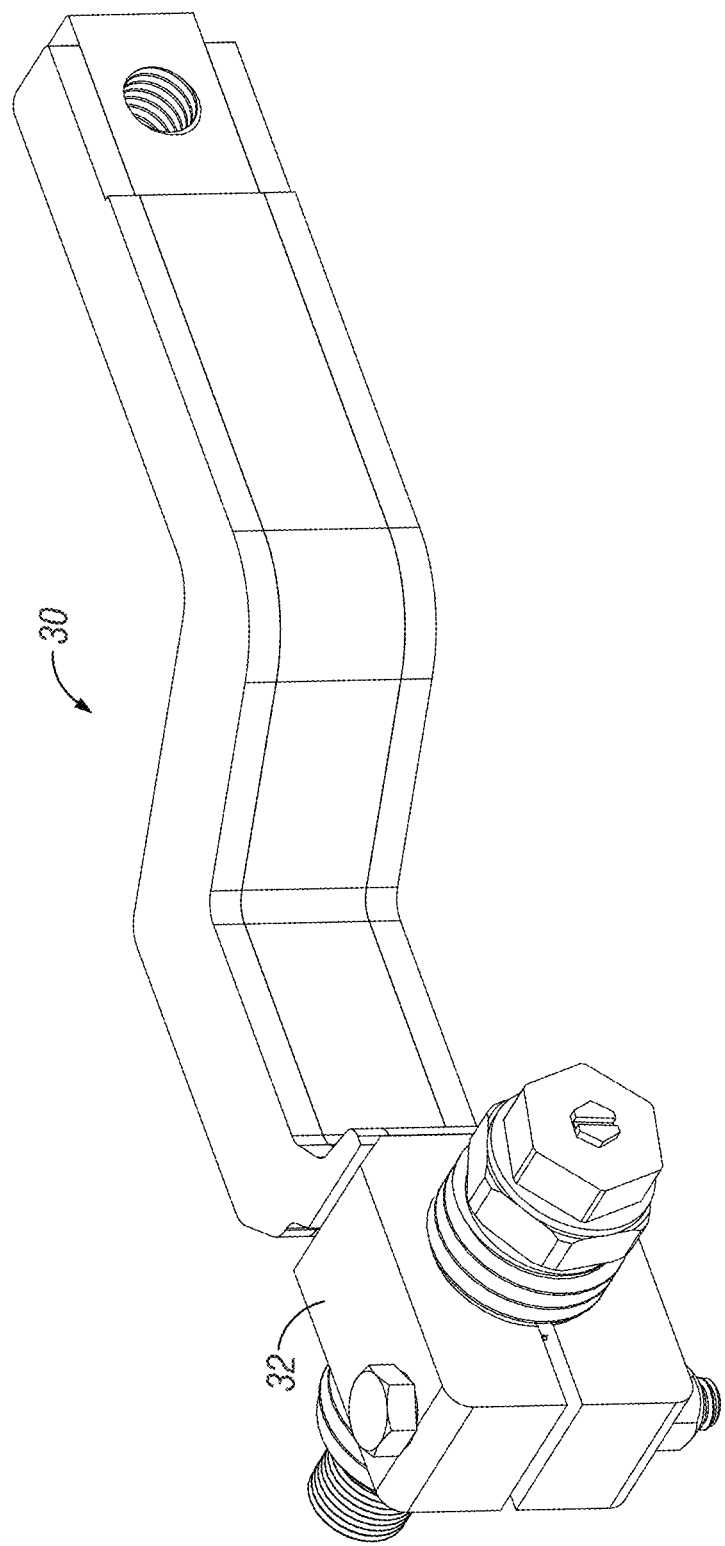
FIG. 3 is a perspective view of the gauge wheel pivot arm for lateral adjustment of the gauge wheel, according to the present invention.
Figure 4:
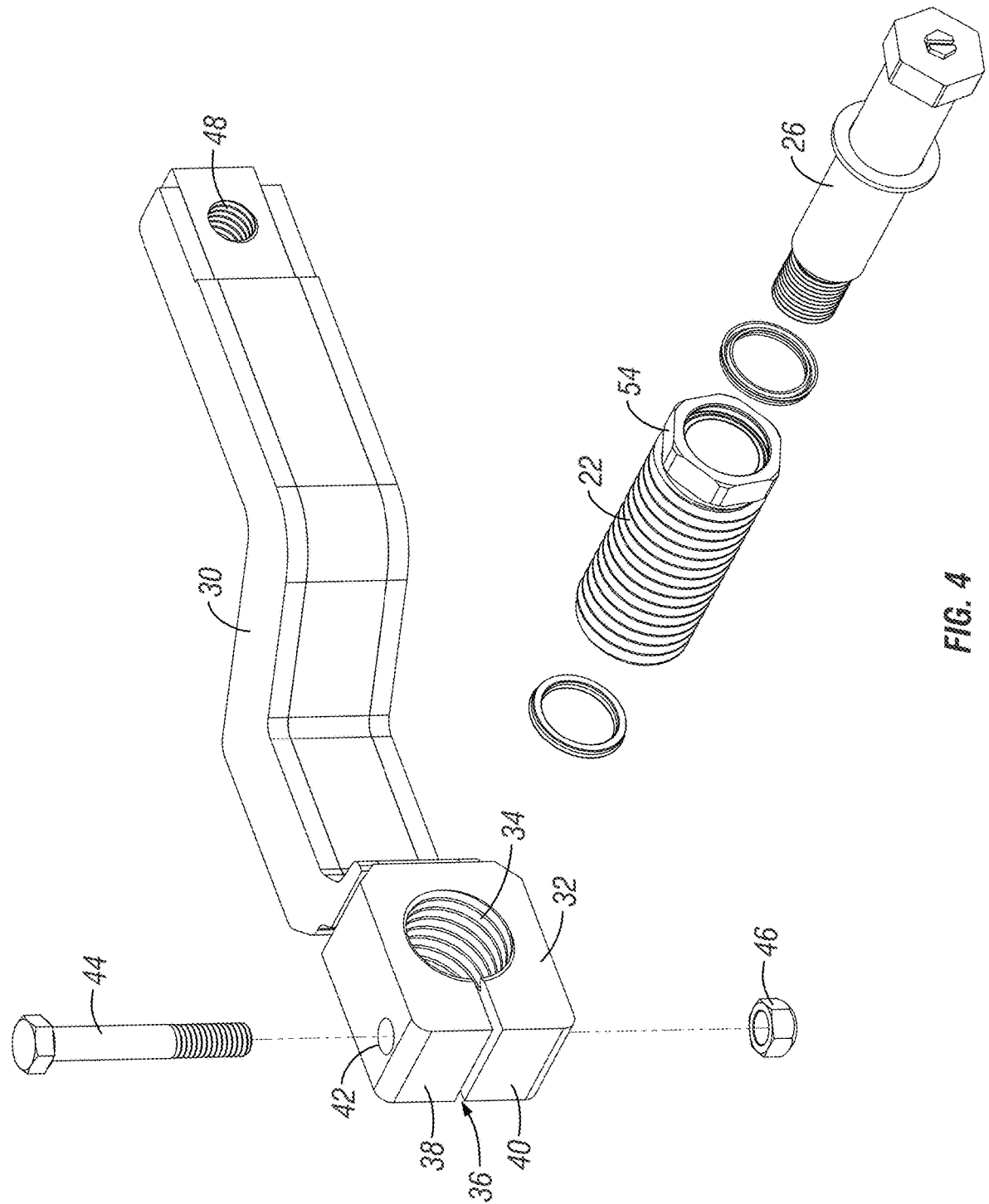
FIG. 4 is an exploded view of the pivot arm shown in FIG. 3.

The gauge wheel mounting arm 30 of the present invention is shown in FIGS. 3 and 4. The arm 30 replaces the arm 20 of the prior art row planter 10. The end of the arm 30 on which the gauge wheel 16 is mounted includes a head 32 with a threaded bore 34 extending therethrough. The head 32 is split by a slot 36 extending from the outer end or face of the head to the threaded bore 34, as best seen in FIG. 4, to form upper and lower split head ends 38, 40. A non-threaded hole 42 extends through the split ends 38, 40 in a direction transverse to the bore 34. A bolt 44 extends through the holes 42, with a nut 46 tightened on the threaded end of the bolt 44.

The inner end of the arm 30 has a hole 48 to receive a bolt 50 to mount the gauge wheel 16 to the arm 30.

Figure 5:
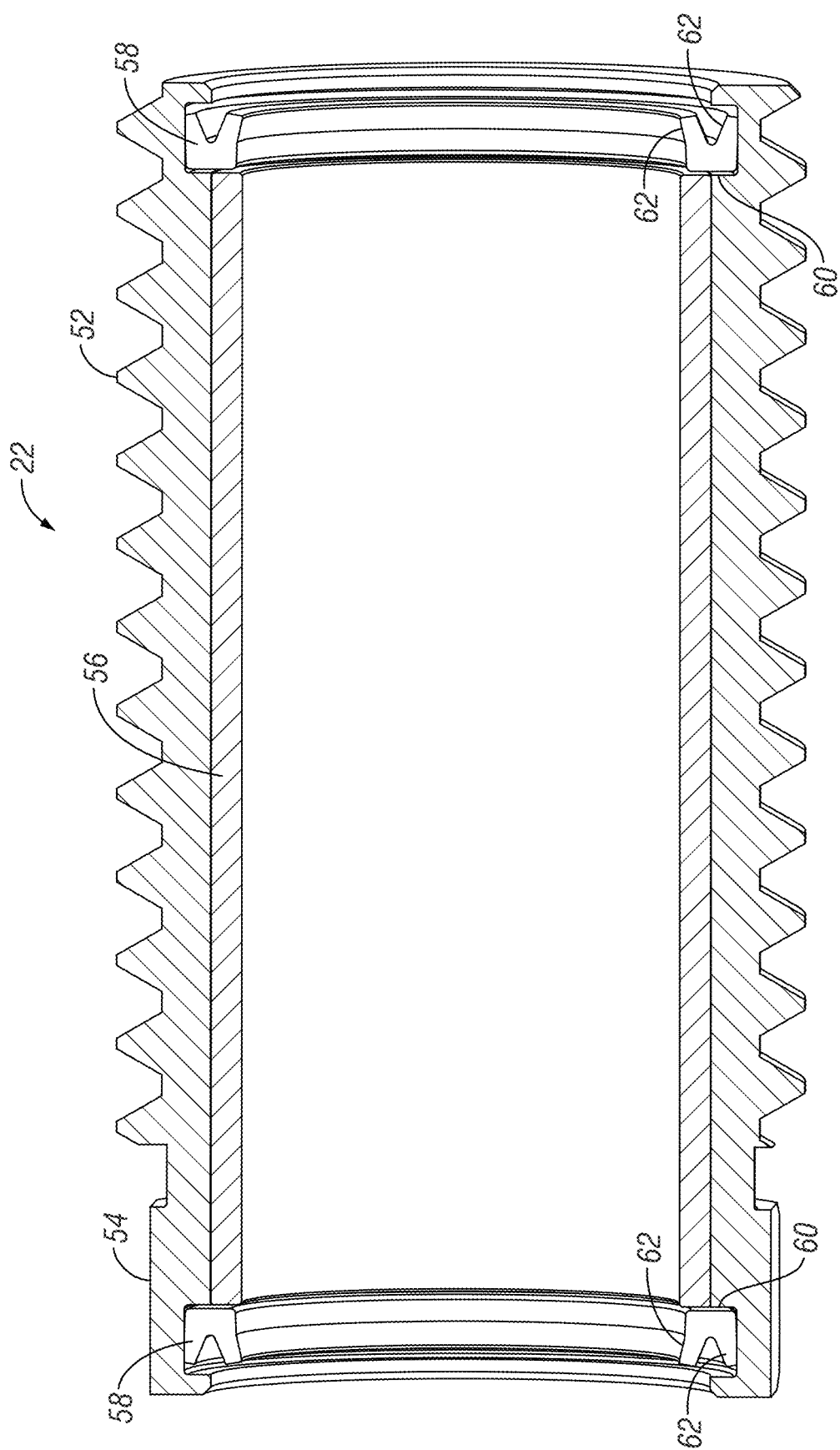
FIG. 5 is a sectional view of the threaded greaseless lateral adjustment bushing for the gauge wheel and pivot arm assembly.

The greaseless bushing 22 is described in Applicant's co-pending application Ser. No. 15/896,225, which is incorporated herein by its entirety by reference. A sectional view of the greaseless busing 22 used in the gauge wheel mounting arm 30, according to the present invention, is shown in FIG. 5. The bushing 22 has external threads 52 for threaded receipt in the bore 34 of the arm 30. The lock nut 24 of the prior art assembly (FIG. 2) is eliminated. The bushing 22 includes a hex end 54 for turning the bushing using a wrench or other tool. The bushing 22 is hollow, with an internal sleeve 56 made of a composite, non-metallic material. The low friction material of the sleeve 56 eliminates the need to grease the bushing 22. The inner sleeve 56 is pressed into the bushing 22, thereby allowing the assembly to pivot on the pivot bolt 26.

The bushing 22 includes a pair of annular seals 58, each of which are received in a groove 60 formed on the interior wall at each end of the bushing 22. Preferably, the seals 58 are a wiper-type seal, with a V-shaped cross-section, with leaves 62 facing outwardly toward the ends of the bushing 22. The seals 58 minimize or eliminate dust contamination within the bushings 22, thereby preventing lock up or freezing of the mounting arm 30.

The split end clamp style mounting arm 30 with the threaded bore 34 and the clamping bolt 44 has many advantages over the prior art gauge wheel mounting arms. For example, the arm 30 eliminates shim washers, thereby eliminating removal of the gauge wheel arms for adjustment. The arm 30 also eliminates the jam nut and set screw of prior art arms, such as those shown in application 2017/0202130 published on Jul. 20, 2017. Furthermore, the arm 30 eliminates extreme or excessive clamp pressure and arm movement, as in prior art clamp arms having a smooth bore. The combination of the split head 38, 40, the clamp bolt 44, and the threaded bore 34 for the threaded, greaseless, lateral adjust bushing assembly 22, allows for quick and easy infinite lateral adjustment of the gauge wheel 16 relative to the opening discs 14, simply by loosening the nut 46 and then turning the bushing assembly 22 using a tool on the hex head 54 of the bushing 22. Thus, the problems of the prior art are eliminated by the clamp arm 30, while allowing the gauge wheel 16 to be finely adjusted so as to maintain proper planting depth during operation of the row planting units 10.

The pivot bolt 26 has an inner threaded end received in a threaded shaft to allow adjustment of the camber of the gauge wheel, as described in U.S. Pat. No. 10,299,427.

The head 32 of the arm 30 is shown in the drawings to be somewhat rectangular, though it is understood that the head could be any shape, for example a round head with tabs or ears to receive the clamp bolt 44.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. A row planter, comprising:
   a frame,
   a pair of discs on the frame to form a furrow in the ground;
   a pair of gauge wheels each being adjustably mounted on the frame via an arm;
   each arm having a split head with a first bore having threads substantially along its length and a second non-threaded bore transverse to the first bore;
   the head having a slot extending from a perimeter edge to the first threaded bore;
   each arm including an adjustment bushing having threads substantially along a full length of the adjustment bushing for threadably extending through the first threaded bore to variable distances so that the arm and gauge wheel is laterally adjustable from an initial lateral position to a second lateral position relative to the discs; and each arm having a bolt extending through the second non-threaded bore and a nut tightenable on a threaded end of the bolt extending beyond the second non-threaded bore to clamp the adjustment bushing in the first threaded bore; and whereby the nut is loosened to allow adjustment of the gauge wheel from the first lateral position to the second lateral position, and the nut is tightened to retain the gauge wheel in the first and second lateral positions; and a pivot bolt extending through the adjustment bushing.

2. The row planter of claim 1 wherein the pivot bolt rotates within the adjustment bushing.

3. The row planter of claim 1 wherein the gauge wheels have an adjustable camber relative to the discs.

4. A mounting assembly for a gauge wheel on a row planter, comprising:

an arm having opposite first and second ends;

a bore extending through the arm at the first end and threaded substantially along its length;

a threaded bushing with threads extending continuously along substantially its full length to thread into the threaded bore;

a slot extending from an outer surface of the arm at the first end to the threaded bore so as to define a clamp with spaced tips on the first end of the arm;

a non-threaded hole extending through the clamp tips;

a first bolt extending through the hole; and a nut threaded on the first bolt to tighten the clamp tips; and the bushing being rotatable in the threaded bore when the nut is loosened to allow lateral adjustment of the gauge wheel relative to discs on the row planter;

and the bushing being fixed in the threaded bore when the nut is tightened to clamp the bore threads and the bushing threads together and thereby secure the gauge wheel in a selected position; and a second bolt extending through the bushing and into a hole in the row planter to mount the arm and the gauge wheel to the row planter.

5. The mounting assembly of claim 4 further comprising a third bolt extending through the gauge wheel and through a hole in the second end of the arm.

6. A method of laterally adjusting a gauge wheel on an agricultural row unit, comprising:

mounting the gauge wheel on a first end of an elongated arm;

mounting a split second end of the arm to the row unit using a first bolt extending through a bushing having continuous threads threaded into a bore in the second end of the arm so that the threads of the bushing and threads of the bore matingly engage along a full length of the bore;

extending a second bolt through non-threaded holes in the split second end of the arm so that a threaded end of the second bolt is exposed and tightening a nut on the threaded end of the second bolt so as to clamp the mating threads of the bushing and the bore to fix the bushing against rotation in the bore so as to set an initial lateral position of the gauge wheel;

loosening the nut on the second bolt to allow the bushing to be turned in the threaded bore to adjust the lateral position of the gauge wheel; and then retightening the nut on the second bolt to lock the gauge wheel in a second adjusted lateral position.

7. The method of claim 6 wherein the gauge wheel is adjusted without use of shims, jam nuts, or set screws.

8. The method of claim 6 wherein the second bolt clamps the bushing in the bore of the arm.

9. The method of claim 6 wherein the first and second bolts extend substantially perpendicular to one another.

\* \* \* \* \*